(12) United States Patent
Harada et al.

(10) Patent No.: US 6,939,522 B1
(45) Date of Patent: Sep. 6, 2005

(54) HONEYCOMB STRUCTURE

(75) Inventors: Takashi Harada, Nagoya (JP); Yukio Miyairi, Nagoya (JP)

(73) Assignee: NGK Insulators, Ltd., (JP)

( * ) Notice: Subject to any disclaimer, the term of this patent is extended or adjusted under 35 U.S.C. 154(b) by 562 days.

(21) Appl. No.: 09/889,375

(22) PCT Filed: Nov. 15, 2000

(86) PCT No.: PCT/JP00/08044

§ 371 (c)(1),
(2), (4) Date: Jul. 16, 2001

(87) PCT Pub. No.: WO01/37971

PCT Pub. Date: May 31, 2001

(30) Foreign Application Priority Data

Nov. 19, 1999 (JP) .................................. 11-329848

(51) Int. Cl.⁷ ............................................... B01J 35/02
(52) U.S. Cl. .................................................. 422/211
(58) Field of Search ........................ 422/211, 174, 175, 422/177, 179, 180; 428/116; 55/DIG. 30; 60/300

(56) References Cited

U.S. PATENT DOCUMENTS 3,927,300 A * 12/1975 Wada et al. ................. 392/502
4,781,831 A     11/1988 Goldsmith ................... 210/247
5,063,029 A *  11/1991 Mizuno et al. .............. 422/175
5,202,547 A *   4/1993 Abe et al. .................... 219/552
5,538,697 A *   7/1996 Abe et al. .................... 422/171

FOREIGN PATENT DOCUMENTS

| EP | 0 283 220 | 9/1988 |
| EP | 0 787 524 | 8/1997 |
| JP | 50-114409 | 9/1975 |
| JP | 59-199586 | 11/1984 |
| JP | 03-121218 | 5/1991 |
| JP | 3-258347 | 11/1991 |
| JP | 5-27215 | 4/1993 |
| JP | 7-189666 | 7/1995 |
| JP | 07-189668 | 7/1997 |
| JP | 2000-153117 | 6/2000 |

* cited by examiner

Primary Examiner—Jonathan Johnson
(74) Attorney, Agent, or Firm—Parkhurst & Wendel, L.L.P.

(57) ABSTRACT

A honeycomb structure (10) having a large number of through-holes (11) formed in the axial direction and defined by partition walls, wherein slits (12) are formed so as to be exposed to at least part of the outer surface (13) of the honeycomb structure along the axial direction. In this honeycomb structure, each portion can deform freely without being restricted by other portion even when an uneven temperature distribution appears therein; as a result, reduction in thermal stress is possible and generation of cracks can be prevented.

16 Claims, 10 Drawing Sheets

US 6,939,522 B1

HONEYCOMB STRUCTURE

TECHNICAL FIELD

The present invention relates to a honeycomb structure for catalyst loading, used in an exhaust gas purifier of a heat engine (e.g. an internal combustion engine) or a burner (e.g. a boiler), a reforming unit of a liquid fuel or a gaseous fuel, and the like; as well as to a honeycomb structure used as a filter.

BACKGROUND ART

Honeycomb structures having a catalyst component loaded thereon have been used in an exhaust gas purifier of a heat engine (e.g. an internal combustion engine) or a burner (e.g. a boiler), a reforming unit of a liquid fuel or a gaseous fuel, and the like. It is known that honeycomb structures are also used as a filter for capturing and removing the particulate matter contained in a dust-containing fluid such as exhaust gas emitted from a diesel engine.

The honeycomb structures used for such purposes have had problems; for example, they undergo rapid temperature change or local heating by the action of an exhaust gas, an uneven temperature distribution appears therein, resultantly they come to have cracks. Particularly when they were used as a filter for capturing the particulate matter contained in the exhaust gas emitted from a diesel engine, cracks appeared easily because the carbon fine particles accumulated on the filter must be burnt for removal and it inevitably causes local heating to high temperatures and easily generates a large thermal stress. In this case, the thermal stress is generated because the uneven temperature distribution allows different portions of the honeycomb structure to have different thermal expansion deformations and resultantly each portion is restricted by each other and is unable to make free deformation.

To reduce the stress, there was proposed, in, for example, JP-A-59-199586, a honeycomb structure having a large number of through-holes each surrounded by partition walls, wherein partition wall areas having at least one slit are formed at given portions of the honeycomb structure almost uniformly.

In this proposal, small slits are distributed uniformly in a honeycomb structure, thereby the rigidity of the total honeycomb structure is reduced and the freedom of deformation is increased, therefore an effect of stress reduction is achieved. However, the degree of an increase in the freedom of deformation is insufficient; therefore, the above proposal for stress reduction was insufficient for a honeycomb structure used under severe conditions where the unevenness of temperature distribution becomes larger.

In view of the above-mentioned problems of the prior art, the present invention aims at providing a honeycomb structure which gives no cracks by thermal stress during use and which is superior in durability.

DISCLOSURE OF THE INVENTION

According to the present invention there is provided a honeycomb structure having a large number of through-holes formed in the axial direction and defined by partition walls, wherein slits are formed so as to be exposed to at least part of the outer surface of the honeycomb structure along the axial direction.

In the above honeycomb structure, the slits are formed preferably in parallel to the direction of the through-holes.

Also, preferably, the slits are formed at least at one end surface at least at the edge. By forming the slits in this way, each portion of the honeycomb structure can deform freely without being restricted by other portion even when an uneven temperature distribution appears therein; as a result, reduction in thermal stress is possible and generation of cracks can be prevented.

In this case, more preferably, the length of each slit formed at the edge of one end surface is, in the axial direction of the outer surface, 10% or more of the total length of the honeycomb structure and, at the end surface, 10% or more of the diameter of the honeycomb structure.

It is also preferable that each slit is exposed to at least one end surface so as to connect the two points of the end surface edge, because such a honeycomb structure has an increased freedom for deformation in the vicinity of the end surface, reduction in thermal stress is possible, and generation of cracks is prevented. In this case, more preferably, the length of each slit is, in the axial direction of the outer surface, 10% or more of the total length of the honeycomb structure and, at the end surface, 10% or more of the diameter of the honeycomb structure.

When the present honeycomb structure is used under such conditions that the total (total length) of the honeycomb structure comes to have a temperature unevenness, it is preferable that each slit is exposed to the outer surface over its total length in the through-hole direction.

When the total of the honeycomb structure comes to have a large temperature unevenness, it is particularly preferable that each slit is formed so that in each section of the honeycomb structure including each slit there is a continuous area in which no slit is formed and which is not exposed to the outer surface of the honeycomb structure.

In the honeycomb structure of the present invention, it is preferable that in the honeycomb structure section which is normal to the through-holes and in which the length of each slit is largest, the length of each slit is 10% or more, preferably 30% or more of the distance between the outer surface along the axial direction and the center of the honeycomb structure.

In the honeycomb structure of the present invention, it is preferable that each slit is filled with a filler. It is also preferable that the present honeycomb structure is a combination of two or more honeycomb segments.

The above honeycomb structure is preferably made of a material containing, as a main crystal phase, at least one kind selected from the group consisting of cordierite, SiC, SiN, alumina, mullite, aluminum titanate and lithium aluminum silicate.

Preferably, the present honeycomb structure loads thereon a metal having a catalytic action and is usable for purification of the exhaust gas emitted from a heat engine (e.g. an internal combustion engine), a burner (e.g. a boiler) or the like, or for reforming of a liquid fuel or a gaseous fuel. The metal having a catalytic action is preferably at least one kind selected from Pt, Pd and Rh.

In the present honeycomb structure, the sectional shape of the through-holes is preferably any of a triangle, a tetragon, a hexagon and a corrugation from the standpoint of the production of the honeycomb structure.

When the present honeycomb structure is used as a filter for capturing and removing the particulate matter contained in a dust-containing fluid, for example, as a particulate filter for diesel engine, it is preferable that the partition walls surrounding the through-holes have a filtration ability, a given proportion of the through-holes are blocked at one end and the remaining through-holes are blocked at other end.

In the present invention, "the outer surface of the honeycomb structure" refers to the whole outer surface of the honeycomb structure and includes not only the outer surface along the axial direction but also the end surfaces.

BRIEF DESCRIPTION OF THE DRAWINGS

FIG. 7(b) is a view taken along the Z—Z section of FIG. 7(a).

BEST MODE FOR CARRYING OUT THE INVENTION

The honeycomb structure of the present invention has a large number of through-holes formed in the axial direction and defined by partition walls, wherein slits are formed so as to be exposed to at least part of the outer surface of the honeycomb structure. Therefore, the present honeycomb structure generates no cracks by the thermal stress appearing during the use and is extremely superior in durability.

The present invention is described in more detail below with reference to the embodiments shown in the accompanying drawings. However, the present invention is in no way restricted to these embodiments.

Figure 1A:
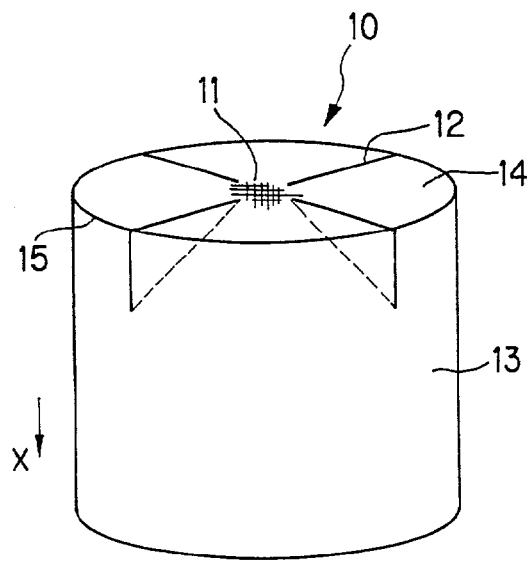
FIG. 1 is perspective views showing examples of the honeycomb structure according to the present invention.

FIGS. 1(a), (b), (c) and (d) are perspective views showing embodiments of the honeycomb structure of the present invention.

In FIGS. 1(a), (b), (c) and (d), 10 is a honeycomb structure. The honeycomb structure 10 has a large number of through-holes 11 formed in the axial direction and defined by partition walls. In the honeycomb structure 10, four slits 12 are formed so as to be exposed to part of the outer surface 13 along the axial direction and be parallel to the direction of the through-holes 11. Each slit 12 is formed so as to cross the edge 15 of the end surface 14.

Figure 1C:
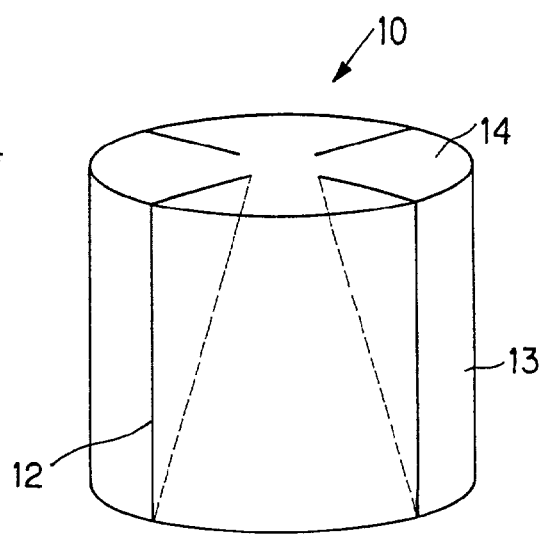
Figure 1B:
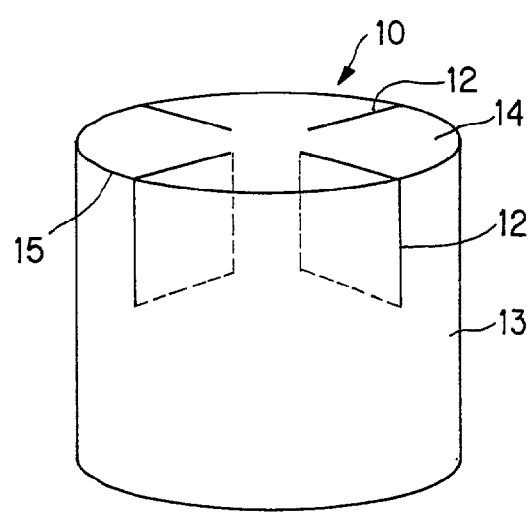
Figure 1D:
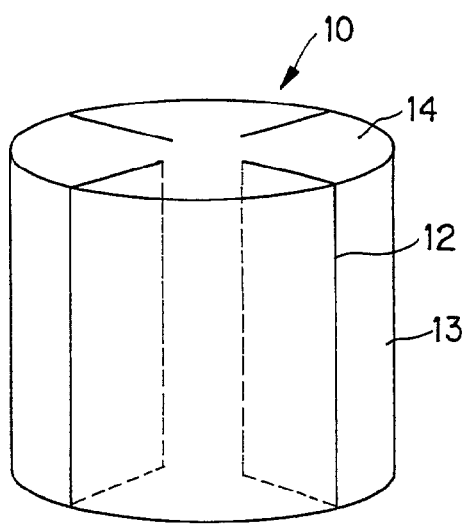

In FIG. 1(a), four slits 12 are formed so as to cross the edge 15 of the end surface 14 and each in the shape of a triangle. In FIG. 1(b), each slit 12 is formed in the shape of a tetragon. In FIG. 1(c), each slit 12 is formed so as to be exposed to the axial direction total length of the outer surface 13 along the axial direction of the honeycomb structure 10 and so that the depth of the slit 12 becomes gradually smaller and each slit has a triangular shape. In FIG. 1(d), each slit 12 is formed so as to be exposed to the axial direction total length of the outer surface 13 along the axial direction of the honeycomb structure 10 and so that the depth of the slit 12 becomes constant in the axial direction of the honeycomb structure 10. By forming slits 12 as shown in FIGS. 1(a), (b), (c) and (d), each portion of the honeycomb structure 10 can deform freely without being restricted by other portion even when an uneven temperature distribution appears in the honeycomb structure 10 (that is, temperature difference exists between the portions of the honeycomb structure 10); thereby, the thermal stress is reduced; and generation of cracks is minimized.

Figure 2A:
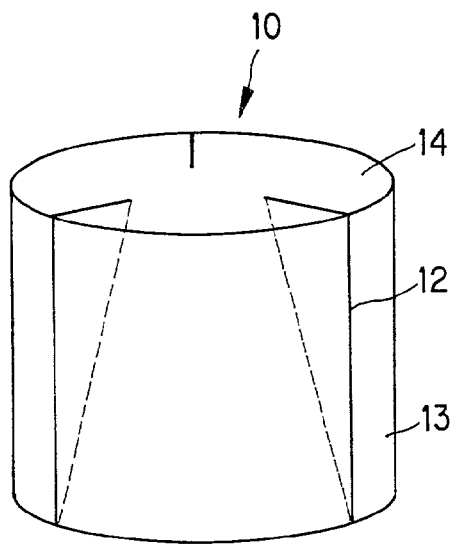
FIG. 2 is perspective views showing other examples of the honeycomb structure according to the present invention.
Figure 2B:
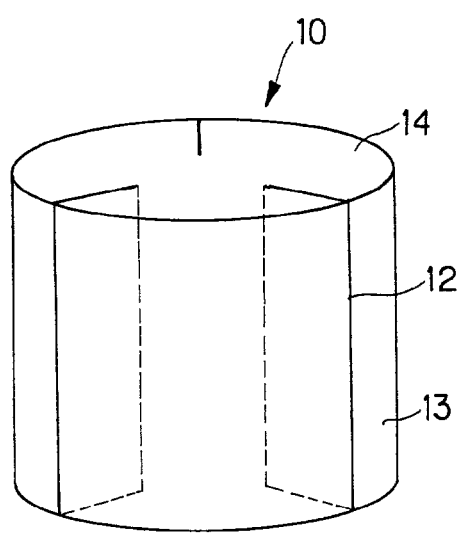

In FIG. 2(a), three slits 12 are formed. As in FIG. 1(c), each slit 12 is formed so as to be exposed to the axial direction total length of the outer surface 13 along the axial direction of the honeycomb structure 10 and so that the depth of the slit 12 becomes gradually smaller and each slit has a triangular shape. In FIG. 2(b), three slits 12 are formed and, as in FIG. 1(d), each slit 12 is formed so as to be exposed to the axial direction total length of the outer surface 13 along the axial direction of the honeycomb structure 10 and so that the depth of the slit 12 becomes constant in the axial direction of the honeycomb structure 10. These embodiments are particularly effective when the honeycomb structure is used under such conditions that an uneven temperature distribution appears over the total length of the honeycomb structure.

Figure 3A:
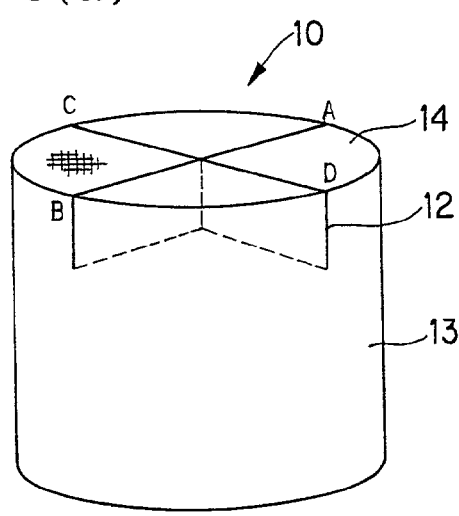
FIG. 3 is perspective views showing still other examples of the honeycomb structure according to the present invention.

FIGS. 3(a) and (b) are perspective views showing other examples of the honeycomb structure of the present invention.

Figure 3B:
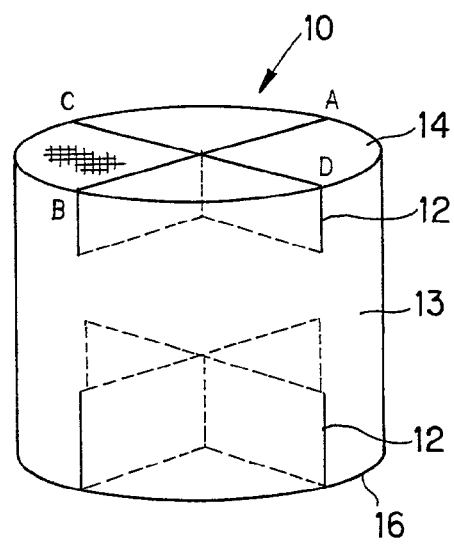

In the example of FIG. 3(a), slits 12 are formed so as to be exposed to one end surface 14 and connect the two points (A and B) or (C and D) of an end surface edge 15. In the example of FIG. 3(b), slits 12 are formed at two end surfaces 14 and 16 so as to be exposed to each of them and connect each two points of an end surface edge 15.

Figure 4A:
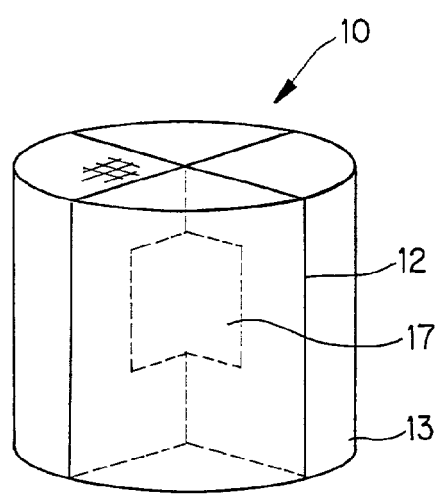
FIG. 4 is perspective views showing still other examples of the honeycomb structure according to the present invention.

FIGS. 4(a), (b), (c) and (d) are perspective views showing still other examples of the honeycomb structure of the present invention.

In each example of FIGS. 4(a), (b), (c) and (d), in each section of a honeycomb structure 10 including a slit 12 there is a continuous area 17 having no slit 12 formed, in the center of the honeycomb structure 10. This continuous area 17 is not exposed to the outer surface of the honeycomb structure, that is, any of the outer surface 13 along the axial direction, the upper end surface 14 and the lower end surface 16. Incidentally, the shape of the continuous area 17 is a rectangle in FIG. 4(a), a circle in FIG. 4(b), a racetrack in FIG. 4(c) and an equilateral tetragon in FIG. 4(d). By forming a honeycomb structure in such a constitution, no cracks are generated in the honeycomb structure even when a large temperature unevenness (for example, large temperature difference between the portions of the honeycomb structure) appears in the whole honeycomb structure.

Figure 5A:
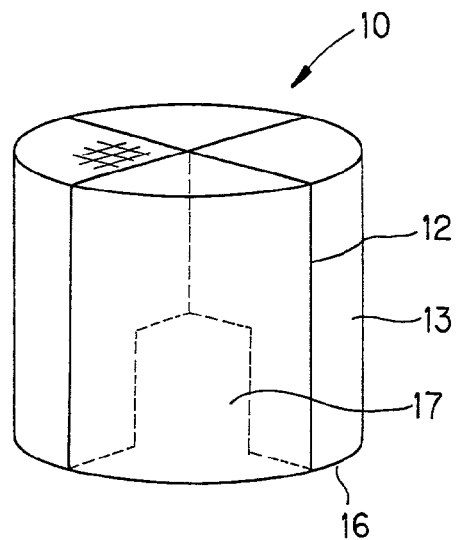
FIG. 5 is perspective views showing still other examples of the honeycomb structure according to the present invention.
Figure 5B:
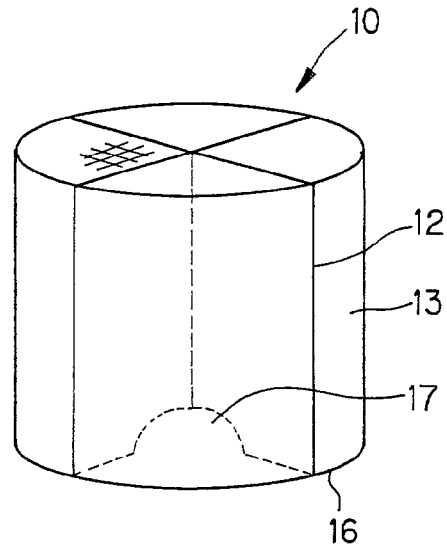
Figure 5C:
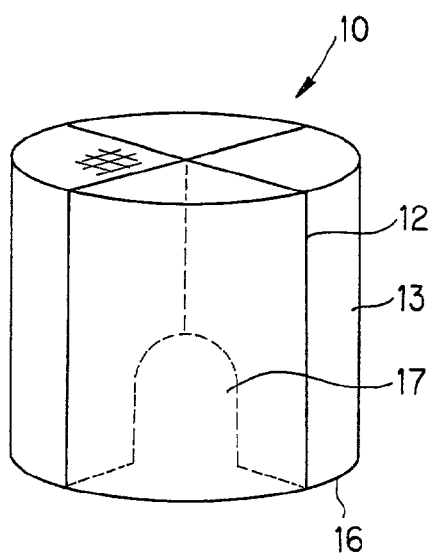
Figure 5D:
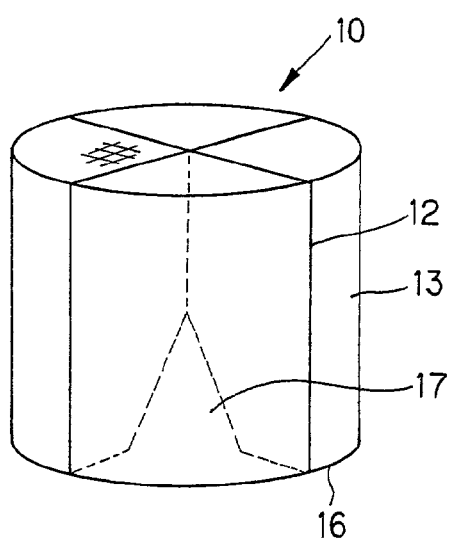

In each example of FIGS. 5(a), (b), (c) and (d), in each section of a honeycomb structure 10 including a slit 12 there is a continuous area 17 having no slit 12 formed and part of the continuous area 17 is exposed to the lower end surface 16 of the honeycomb structure 10.

Figure 6A:
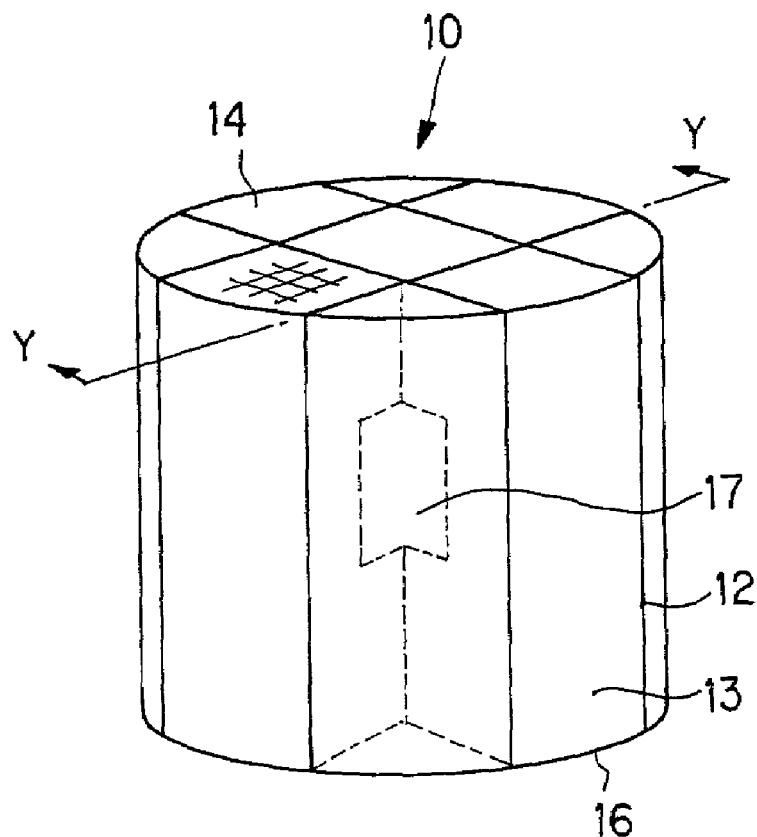
FIG. 6(a) is a perspective view showing still other example of the honeycomb structure according to the present invention.
Figure 6B:
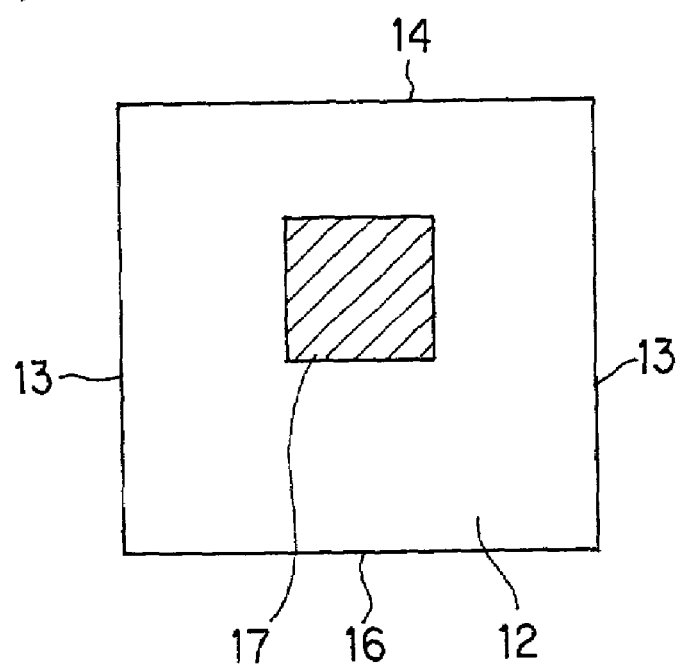
FIG. 6(b) is a view taken along the Y—Y section of FIG. 6(a).
Figure 7A:
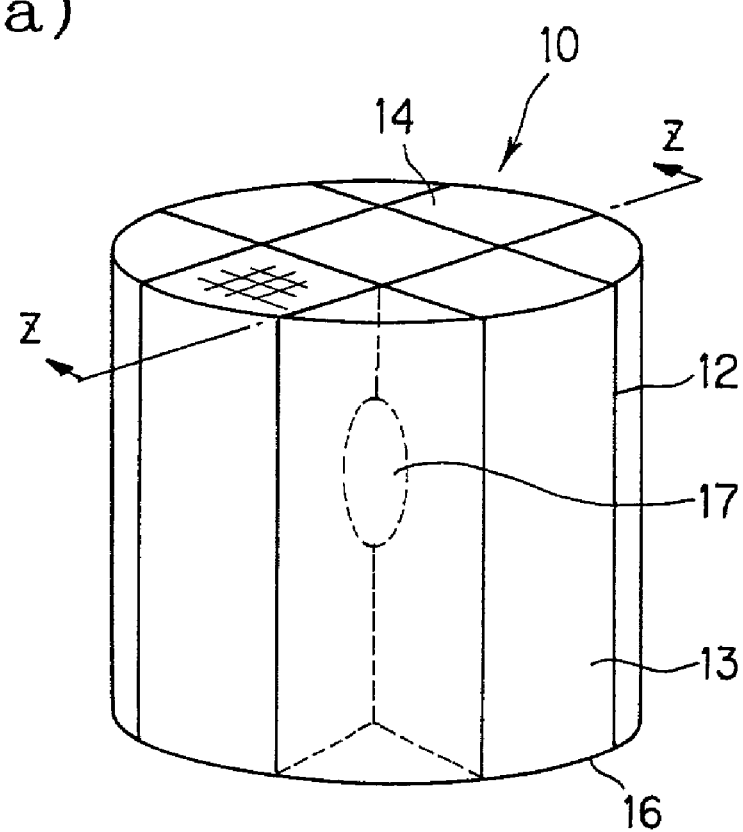
FIG. 7(b) is a perspective view showing still other example of the honeycomb structure according to the present invention.
Figure 7B:
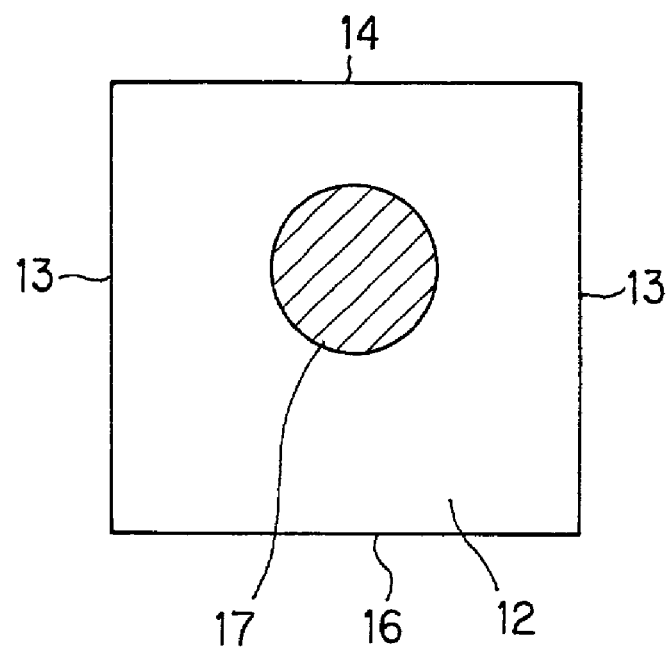

FIGS. 6(a) and (b) and FIGS. 7(a) and (b) are other examples in which a continuous area is not exposed to the outer surface of a honeycomb structure. FIG. 6(a) is a perspective view and FIG. 6(b) is a sectional view taken along the Y—Y section of FIG. 6(a). FIG. 7(a) is a perspective view and FIG. 7(b) is a sectional view taken along the Z—Z section of FIG. 7(a).

In the example of FIGS. 6(a) and (b), the shape of a continuous area 17 is a rectangle as in FIG. 4(a), and the continues area 17 is not exposed to the outer surface of the honeycomb structure 10. In this example, however, the number of slits 12 is larger than in FIG. 4(a). In the example of FIG. 7(a) and (b), the shape of a continuous area 17 is an ellipse, and the continuos area 17 is not exposed to the outer surface of the honeycomb structure 10.

Next, the constituent features of the honeycomb structure of the present invention are described in more detail.

In the honeycomb structure of the present invention, the length of each slit is preferably 10% or more, more preferably 30% or more of the distance between the outer surface along the axial direction and the center of the honeycomb structure, in a honeycomb structure section which is normal to the through-holes and in which the length of the slit becomes largest.

In the honeycomb structure of the present invention, slits are preferably formed in point symmetry in a honeycomb structure section normal to the through-holes because deformation occurs in the honeycomb structure with substantially no partiality. However, slit formation is not restricted thereto and slits 12 may be disposed, for example, as shown in FIGS. 11(a) to (d).

Figure 8A:
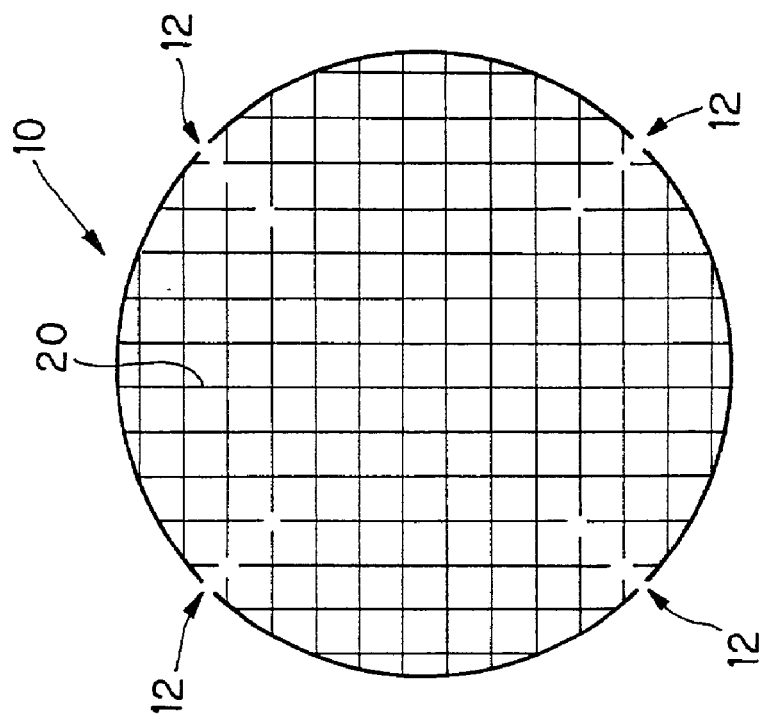
FIG. 8(a) shows a method for slit formation and indicates a state in which slits are formed in parallel to partition walls.
Figure 8B:
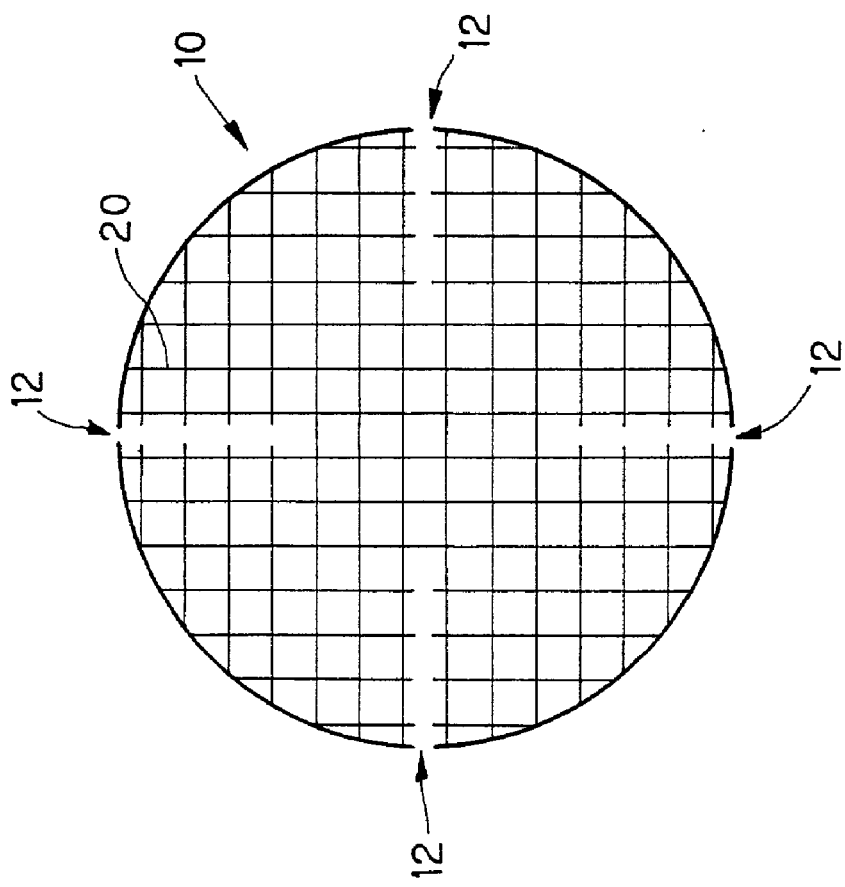
FIG. 8(b) indicates a state in which slits are formed so as to cut partition walls obliquely.

Slits 12 may be formed so as to cut partition walls 20 obliquely (not in parallel thereto), as shown in FIG. 8(b). However, slits are preferably formed in parallel to partition walls 20, as shown in FIG. 8(a), because the stress concentration at the front end of each slit 12 is small.

When the sectional shape of the through-holes 11 of the honeycomb structure 10 is a triangle, slits 12 are preferably in a direction of 60° or 120°, for the same reason as mentioned above.

The width of each slit 12 is not critical and can be determined as desired. However, the width is desirably smaller than the width of each through-hole because too large a slit width incurs increases in filling steps and filling amount of filler and a decrease in the number of cells usable for purification of fluid (e.g. gas).

Figure 9A:
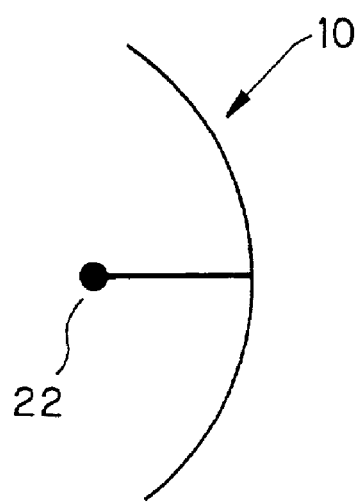
FIG. 9(a) shows a stress-relaxing mechanism provided at the front end of each slit, i.e. a stress-relaxing portion having a curvature provided at the front end of each slit.
Figure 9B:
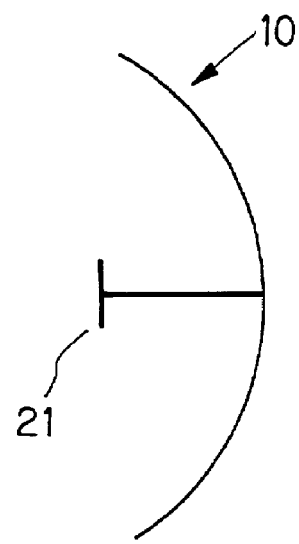
FIG. 9(b) shows branches provided at the front end of each slit.

Further in the honeycomb structure 10 of the present invention, it is preferable for relaxation of thermal stress to form, at the front end of each slit 12, a branch part 21 formed by branching, as shown in FIG. 9(b), or a stress relaxation part 22 having a curvature, as shown in FIG. 9(a).

Figure 10B:
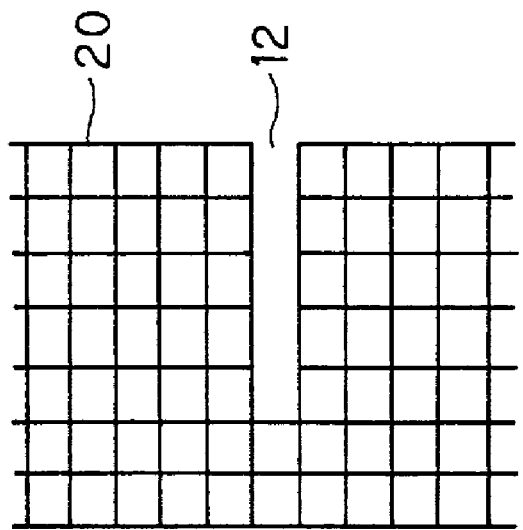
FIG. 10(b) shows a form of slit formed by removing part of partition walls.
Figure 10A:
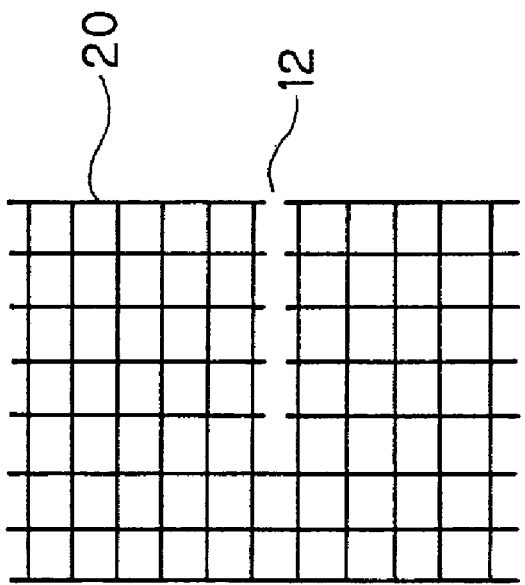
FIG. 10(a) shows a form of slit formed by cutting part of partition walls.
Figure 11A:
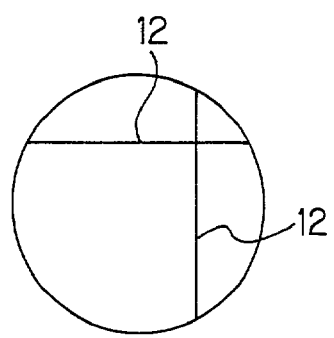
FIG. 11(a) is a plan view showing an example of the disposition of slits in the honeycomb structure of the present invention.
Figure 11B:
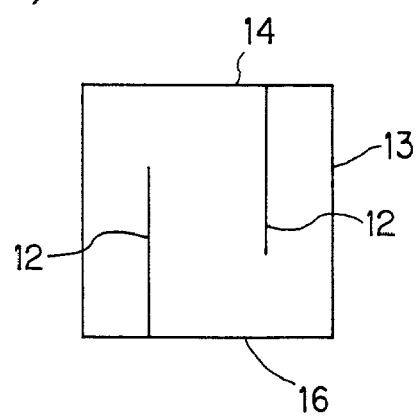
FIG. 11(b) is a front view of the example.
Figure 11C:
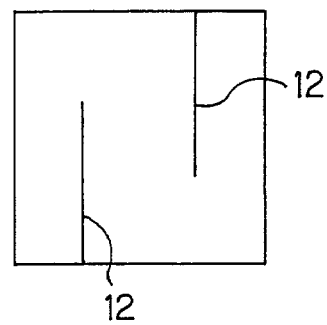
FIG. 11(c) is a side view of the example.
Figure 11D:
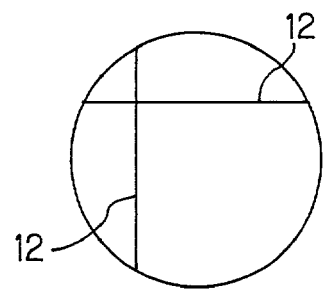
FIG. 11(d) is a bottom view of the example.

The form of each slit 12 may be a form obtained by partially cutting partition walls 20 of a honeycomb structure 10, as shown in FIG. 10(a), or a form obtained by partially removing partition walls 20, as shown in FIG. 10(b).

In the honeycomb structure of the present invention, the sectional shape of each through-hole may be various, for example, a circle, an ellipse and a racetrack.

The honeycomb structure of the present invention is preferably a combination of two or more honeycomb segments. The material constituting the present honeycomb structure preferably contains, as a main crystal phase, at least one kind selected from the group consisting of cordierite, SiC, SiN, alumina, mullite, aluminum titanate and lithium aluminum silicate. SiC of high thermal conductivity is particularly preferred because it releases the absorbed heat easily.

The density of the cells surrounded by partition walls is preferably 6 to 2,000 cells/in.$^2$ (0.9 to 311 cells/cm$^2$), more preferably 50 to 400 cells/in.$^2$ (7.8 to 62 cells/cm$^2$). When the cell density is less than 6 cells/in.$^2$ (0.9 cell/cm$^2$), the resulting honeycomb segments are insufficient in strength and effective GSA (geometrical surface area); when the cell density is more than 2,000 cell/in.$^2$ (311 cells/cm$^2$), the resulting honeycomb segments show a large pressure loss when a gas flows therethrough.

The sectional shape of the through-holes, i.e. the cell shape is preferably any of a triangle, a tetragon and a hexagon from the standpoint of honeycomb production.

With respect to the filler used for filling the slits formed in the honeycomb structure, a ceramic fiber, a ceramic powder, a cement, etc. all having heat resistance are preferably used singly or in admixture. As necessary, an organic binder, an inorganic binder, etc. may be mixed with the filler.

When the honeycomb structure of the present invention is used as a catalyst carrier for purification of the exhaust gas emitted from a heat engine (e.g. an internal combustion engine) or a burner (e.g. a boiler), or for reforming of a liquid fuel or a gaseous fuel, a metal having a catalytic activity is loaded on the honeycomb segments constituting the honeycomb structure. As representative metals having a catalytic activity, there can be mentioned Pt, Pd and Rh. At least one kind of these metals is preferably loaded on the honeycomb segments.

Meanwhile, when the honeycomb structure of the present invention is used as a filter for capturing and removing the particulate matter contained in a dust-containing fluid, for example, a particulate filter for diesel engine, the honeycomb structure preferably has such a structure that the partition walls surrounding the through-holes has a filtration ability, given proportions of the through-holes are blocked at one end, and the remaining through-holes are blocked at other end.

When a dust-containing fluid is allowed to enter such a honeycomb structure from one end surface, the dust-containing fluid enters the inside of the honeycomb structure from those through-holes not blocked at the above end surface, passes through the partition walls having a filtration ability, and enters other through-holes not blocked at other end surface. During the period in which the dust-containing fluid passes through the partition walls, the particulate matter contained in the fluid is captured by the partition walls, and a particulate matter-free, purified fluid is discharged from the other end surface of the honeycomb structure.

As the accumulation of the captured particulate matter on the partition walls proceeds, plugging appears, which reduces the filtration ability of the honeycomb structure. Therefore, the honeycomb structure is periodically heated using a means such as heater or the like, whereby the captured particulate matter are burnt completely and the filtration ability is revitalized. In order to promote the burning of the particulate matter during the revitalization, it is possible to allow the honeycomb structure to load the above-mentioned metal having a catalytic action.

The present invention is described in more detail below by way of Examples. However, the present invention is not restricted to these Examples.

EXAMPLE 1

By using a SiC-made honeycomb structure having a size of 144 mm (diameter) and 152 mm, a partition wall thickness of 0.3 mm and a cell density of 31 cells/cm$^2$ and by blocking given proportions of the through-holes at one end and the remaining through-holes at other end, there were produced honeycomb structures each as a particulate filter for purification of diesel engine exhaust gas. They were produced so as to have slits as shown in FIG. 1(a), FIG. 1(d) FIG. 3(a), FIG. 3(b), FIG. 4(a), FIG. 4(b) or FIG. 7, or so as to have no slit (a basic honeycomb structure). In the honeycomb structures of FIGS. 1(a) and 1(d), the length of each slit at the upper end surface 14 was ½ of the radius of the honeycomb structure 10. In the honeycomb structures of FIGS. 1(a) and 3(a), the axial direction length of each slit at the outer surface 13 was 20 mm; in the honeycomb structure of FIG. 3(b), the axial direction outer surface length of each slit formed at the upper end surface 14 was 15 mm and the axial direction outer surface length of each slit formed at the lower end surface 16 was 30 mm.

In the thus-produced honeycomb structures, those cells in which slits were formed, were sealed with a filler; then, a ceramic-made non-expansion mat (as a holding member) was wound round the periphery of each honeycomb structure; the resulting honeycomb structure was forced into a SUS 409-made canning case to produce various canning structures. These canning structures were each subjected to the following filter revitalization test. That is, a soot-containing combustion gas generated by burning of a gas oil for diesel engine was allowed to flow into each honeycomb structure from the lower end surface (the lower end surface in each Drawing) and leave from the upper end surface, whereby the soot in the combustion gas was captured inside the honeycomb structure. The soot-captured honeycomb structure was allowed to cool to room temperature, after which a combustion gas containing a given proportion of oxygen was allowed to flow into the honeycomb structure from the lower end surface at 800° C. to completely burn the soot captured in the honeycomb structure.

The transition period necessary for elevating the inlet gas temperature to 800° C. and the weight of the soot captured were each set at three levels, and the filter revitalization test was carried out. The appearance of cracks was examined at each site of the upper end surface (outlet), lower end surface (inlet), outer surface along axial direction and inside of each honeycomb structure. The results are shown in Table 1.

TABLE 1

Figure 4B:
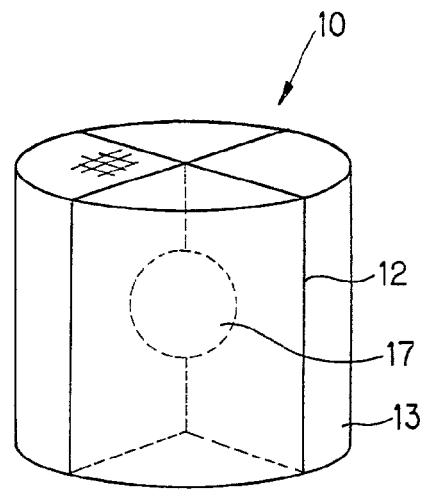
Figure 4C:
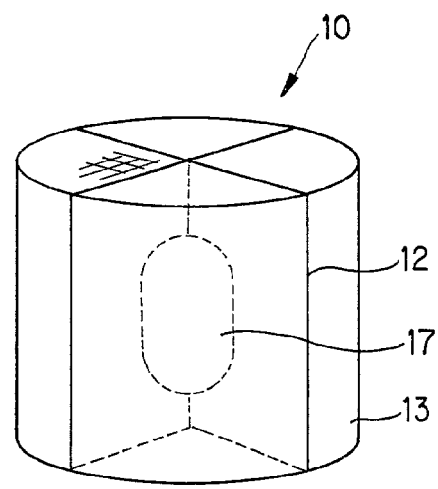
Figure 4D:
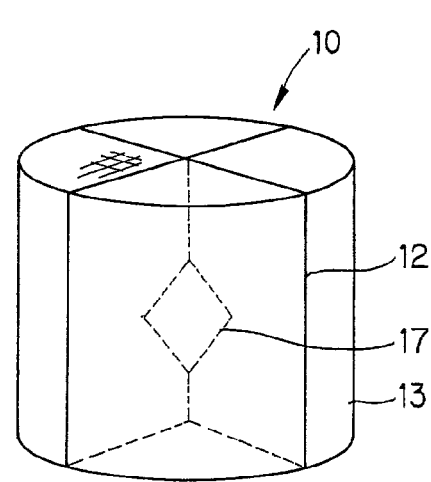

| | Soot weight | | | | | | | | | | | |
|---|---|---|---|---|---|---|---|---|---|---|---|---|
| | Largest | | | | Large | | | | Standard | | | |
| | Transition period | | | | | | | | | | | |
| | Shortest | | | | Short | | | | Standard | | | |
| Site of cracks | Inlet | Outlet | Inside | Outer surface | Inlet | Outlet | Inside | Outer surface | Inlet | Outlet | Inside | Outer surface |
| FIG. 1(a) | ▲ | ▲ | ▲ | ▲ | ▲ | ○ | ○ | ▲ | ○ | ○ | ○ | ○ |
| FIG. 1(d) | ▲ | ▲ | ▲ | ▲ | ○ | ○ | ○ | ○ | ○ | ○ | ○ | ○ |
| FIG. 3(a) | ▲ | ○ | ▲ | ▲ | ▲ | ○ | ▲ | ▲ | ○ | ○ | ○ | ○ |
| FIG. 3(b) | ○ | ○ | ▲ | ▲ | ○ | ○ | ▲ | ▲ | ○ | ○ | ○ | ○ |
| FIG. 4(a) | ○ | ○ | ▲ | ▲ | ○ | ○ | ○ | ○ | ○ | ○ | ○ | ○ |
| FIG. 4(b) | ○ | ○ | ○ | ▲ | ○ | ○ | ○ | ○ | ○ | ○ | ○ | ○ |
| FIG. 7 | ○ | ○ | ○ | ○ | ○ | ○ | ○ | ○ | ○ | ○ | ○ | ○ |
| No slit | ▲ | ▲ | ▲ | ▲ | ▲ | ▲ | ▲ | ▲ | ▲ | ▲ | ○ | ○ |

▲: Cracks generated.
○: No cracks.

As is clear from Table 1, even in the case of the standard conditions, cracks appeared in the honeycomb structure having no slit, at the end surfaces (inlet and outlet). In contrast, no cracks appeared in the honeycomb structures of the present invention of FIG. 1(a), FIG. 1(d), FIG. 3(a), FIG. 3(b), FIG. 4(a), FIG. 4(b) and FIG. 7.

When the transition period was shortened and the weight of the soot captured was increased, temperature unevenness became larger and cracks appeared partially when slits were formed only in the vicinity of one end surface of honeycomb structure as in FIG. 1(a) or FIG. 3(a); however, substantially no cracks appeared when a continuous area was not exposed to the outer surface of honeycomb structure as in FIG. 4(b), and no cracks appeared when slits were formed in an increased number as in FIG. 7.

EXAMPLE 2

Using honeycomb structures shown in Table 2, having the same shapes and sizes as in Example 1 except that the dispositions and lengths of slits were changed, a filter revitalization test of completely burning and removing the soot accumulated was carried out in the same manner as in Example 1. The results are shown in Table 2.

TABLE 2

| Sample No. | 1 | 2 | 3 | 4 |
|---|---|---|---|---|
| Structure | FIG. 1(a) | FIG. 3(a) | FIG. 1(a) | FIG. 3(a) |
| Slit length at end surface | 50 mm | 15 mm | 15 mm | 5 mm |
| Slit length at outer surface | 30 mm | 15 mm | 5 mm | 5 mm |
| Weight of soot captured | | | | |
| 10 g/L | ○ | ○ | ○ | ○ |

TABLE 2-continued

| Sample No. | 1 | 2 | 3 | 4 |
|---|---|---|---|---|
| 12 g/L | ○ | ○ | ○ | X |
| 14 g/L | ○ | ○ | X | X |
| 16 g/L | ○ | ○ | X | X |
| 18 g/L | ○ | ○ | X | X |
| 20 g/L | ○ | X | X | X |

○: No cracks.
X: Cracks appeared.
g/L: gram/liter.

As is clear from the results of Table 2, an increase in weight of soot captured results in an increase in cracks formed when the lengths of slit at end surface and outer surface are smaller than given levles.

A described above, in the honeycomb structure of the present invention, each portion of the honeycomb structure can deform freely without being restricted by other portion even when there is an uneven temperature distribution in the honeycomb structure and, therefore, reduction in thermal stress is possible; as a result, generation of cracks can be prevented.

What is claimed is:

1. A honeycomb structure having a large number of through-holes formed in the axial direction and defined by partition walls, wherein (1) slits are formed so as to be exposed to at least part of the outer surface of the honeycomb structure along the axial direction, (2) the honeycomb structure is made of a material containing, as a main crystal phase, at least one member selected from the group consisting of cordierite, SiC, SiN, alumina, mullite, aluminum titanate and lithium aluminum silicate, and (3) in each section of the honeycomb structure including each slit, each slit is exposed along an upper end surface and a lower end surface of the honeycomb structure and there is a continuous area in the center of the honeycomb structure in which no slit is formed and which is not exposed to the outer surface of the honeycomb structure.

2. A honeycomb structure according to claim 1, wherein the slits are formed in parallel to the direction of the through-holes.

3. A honeycomb structure according to claim 1, wherein the slits are formed at least at one end surface at least at the edge.

4. A honeycomb structure according to claim 3, wherein the length of each slit formed at the edge of one end surface is, in the axial direction of the outer surface, 10% or more of the total length of the honeycomb structure and, at the end surface, 10% or more of the diameter of the honeycomb structure.

5. A honeycomb structure according to claim 1, wherein each slit is exposed to at least one end surface so as to connect the two points of the end surface edge.

6. A honeycomb structure according to claim 5, wherein the length of each slit is, in the axial direction of the outer surface, 10% or more of the total length of the honeycomb structure and, at the end surface, 10% or more of the diameter of the honeycomb structure.

7. A honeycomb structure according to claim 1, wherein each slit is exposed to the outer surface over its total length in the through-hole direction.

8. A honeycomb structure according to claim 1, wherein in the honeycomb structure section which is normal to the through-holes and in which the length of each slit is largest, the length of each slit is 10% or more of the distance between the outer surface along the axial direction and the center of the honeycomb structure.

9. A honeycomb structure according to claim 1, wherein in the honeycomb section which is normal to the through-holes and in which the length of each slit is largest, the length of each slit is 30% or more of the distance between the outer surface along the axial direction and the center of the honeycomb structure.

10. A honeycomb structure according to claim 1, wherein each slit is filled with a filler.

11. A honeycomb structure according to claim 1, which is a combination of two or more honeycomb segments.

12. A honeycomb structure according to claim 1, which loads thereon a metal having a catalytic action and is usable for purification of the exhaust gas emitted from a heat engine or a burner, or for reforming of a liquid fuel or a gaseous fuel.

13. A honeycomb structure according to claim 12, wherein the metal having a catalytic action is at least one kind selected from Pt, Pd and Rh.

14. A honeycomb structure according to claim 1, wherein the sectional shape of the through-holes is any of a triangle, a tetragon, a hexagon and a corrugation.

15. A honeycomb structure according to claim 1, wherein the partition walls surrounding the through-holes have a filtration ability, a given proportion of the through-holes are blocked at one end and the remaining through-holes are blocked at other end.

16. A honeycomb structure according to claim 15, which is used as a filter for capturing and removing the particulate matter contained in a dust-containing fluid.

* * * * *